United States Patent
Banerjee et al.

(10) Patent No.: US 6,748,296 B2
(45) Date of Patent: Jun. 8, 2004

(54) AUTOMATED VENDING

(75) Inventors: Dwip N. Banerjee, Austin, TX (US); Michael Wayne Brown, Georgetown, TX (US); Rabindranath Dutta, Los Angeles, CA (US); Kumar Ravi, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 10/132,141

(22) Filed: Apr. 25, 2002

(65) Prior Publication Data

US 2003/0204289 A1 Oct. 30, 2003

(51) Int. Cl.$^7$ ............................................... G06F 17/00
(52) U.S. Cl. ....................... 700/241; 700/233; 705/80; 221/1
(58) Field of Search .............................. 700/231, 232, 700/241, 233; 705/80, 37; 235/381; 221/2, 1

(56) References Cited

U.S. PATENT DOCUMENTS

| | | | |
|---|---|---|---|
| 5,544,784 A | | 8/1996 | Malaspina |
| 5,631,536 A | | 5/1997 | Tseng |
| 6,012,834 A | * | 1/2000 | Dueck et al. ............... 700/238 |
| 6,430,537 B1 | * | 8/2002 | Tedesco et al. ............... 705/8 |
| 6,571,150 B2 | * | 5/2003 | Arai et al. ................... 700/236 |
| 2001/0041949 A1 | | 11/2001 | Arai et al. |
| 2001/0052445 A1 | | 12/2001 | Coyne et al. |

OTHER PUBLICATIONS

"Book Trade Vending Machine", download from http://www.halfbakery.com/idea/Book_20Trade_20Vending_20Machine, Oct. 11, 2001–4pgs.

* cited by examiner

*Primary Examiner*—Khoi H. Tran
(74) *Attorney, Agent, or Firm*—Marilyn Smith Dawkins

(57) ABSTRACT

A vending machine is disclosed that has one or more compartments with a mechanism for dispensing a content of a compartment upon receipt of a payment. A receptacle can accept an item, from a member of the public, as content into an empty compartment and identify the item accepted, such as with a barcode label. The vending machine can also include a mechanism that will connect it over a network, such as the Internet, to a computing device. An appraised value of the identified item can be received over the communication network and displayed in association with the compartment containing the item. The item can be dispensed from the vending machine in response to receiving predetermined sales amount or upon specific instruction from an authorized individual. A searchable database of information relating to buyers, sellers, items and other sales related information can also be associated with the vending machine.

26 Claims, 10 Drawing Sheets

| ITEM ID | DESCRIPTION | PRICE |
|---|---|---|
| I001 | LAPTOP PC | $1099 |
| I004 | MING VASE | $599 |
| I005 | BABE RUTH CARD | $199 |
| I006 | GENERIC PATTERN CURTAINS | $99 |
| I010 | ARTWORK PRINT | $899 |
| I017 | 1 DOZ. BASEBALLS | $15.99 |

Fig. 10

AUTOMATED VENDING

BACKGROUND

This invention relates generally to a method and system for facilitating the sale of an item by a member of the public. In particular, the present invention relates to a computerized apparatus and method to identify and accept an item for sale, associate an appraised value for the item and dispense the item in conjunction with a sale.

There are multiple forums for a member of the public to conduct a sale of an item (e.g., a book, rare coin, sports equipment, painting) using a distributed network, such as through an online site via the World Wide Web ("Web sites"). Web sites have been available to place classified ads, include an item in an auction of various types, or use some other online sales vehicle. Accordingly, a person seeking to sell an item has had many options and forums to offer the item for sale and as a result a person seeking to purchase an item has had as many options and forums to locate an item to purchase.

The online sales process has many advantages, such as: the ability to make a description of an item for sale available to a large number of potential customers; allowing a description of the item to be searchable; allowing the seller and buyer to conduct the transaction in relative or complete anonymity; allowing the process to be available twenty four hours a day and other advantages.

However, the work and inconvenience involved in arranging for a transfer of the item from a seller to a buyer can be a detriment to the online sales process. Many members of the public are not equipped to properly pack and ship an item or a seller may not wish to go through the considerable time and expense which may be required to properly arrange for shipping. A physical meeting to transfer the item from a seller to a buyer may also be inconvenient. A detriment to classified ads in a newspaper or via an online Web site is the need to physically meet and deal with a stranger in order to conduct a sale. Typically a member of the public does not have a regular place of business available to consummate the transfer. Not only must a time and place be arranged, but there may be a risk factor involved in meeting a stranger or a transfer of funds. Most members of the public are not equipped to process a credit card transaction and may be uncomfortable accepting a personal check. On the other hand, a buyer may be equally uncomfortable tendering a large amount of cash. In addition, there is a possibility that a buyer may wish to take advantage of the time and effort invested by the seller and try to renegotiate a purchase price in person.

Traditional pawn shops offer an alternative to the online sale in that a pawn shop offers a regular place of business and a ready buyer; however a pawn shop will typically only offer a deeply discounted purchase price for an item. A seller may be able to strike a better bargain if they can deal directly with an ultimate buyer.

It would be advantageous to provide a method and apparatus that overcame the drawbacks of the prior art. In particular, it would be desirable to provide a method and apparatus for facilitating a bargain and sale of an item placed for sale by a member of the public, as well as a delivery vehicle to consummate the sale. In addition, it would be desirable to provide a method and apparatus that allows for a transfer of funds from a buyer to a seller as part of the delivery process.

SUMMARY

The present invention includes an apparatus, such as a vending machine, that has one or more compartments with a mechanism for dispensing a content of a compartment upon receipt of a payment. A receptacle can accept an item, from a member of the public, as content into an empty compartment and identify the item accepted, such as with a barcode label. The vending machine can include a mechanism that will connect it over a network, such as the Internet, to a computing device.

The vending machine can also include a mechanism that can receive an appraised value of the identified item over the communication connection and a mechanism that can display the appraised value in association with the compartment containing the item, such as an Internet website or a hardcopy. The item can be dispensed from the vending machine in response to receiving a predetermined sales amount. The predetermined sales amount can be within a threshold range of the appraised value amount for the item. Some embodiments include a barcode scanner capability for dispensement.

In one aspect of the present invention, the vending machine can be capable of receiving a tangible or intangible item and dispensing value for an item received.

In another aspect, the vending machine can include a mechanism that can receive information, identification and contact information of the member of the public or multiple members of the public involved in a transaction relating to an item, data descriptive of the item, identification information and contact information of the member of the public.

Embodiments include an automated vending machine that accepts an item as content into an empty compartment from a first member of the public and dispenses the item in response to receiving an indication to dispense over the network from the first member of the public or receiving a predetermined payment amount for the item from a second member of the public. An indication to dispense an item can be accomplished over the network from the first member of the public and include an activation of a programmable interactive device contained in a graphical user interface accessible via the network.

In another aspect a first member of the public can place an item for sale into a compartment and be contacted by a second member of the public concerning the item. Contact can be accomplished via the network.

A predetermined payment amount can be an amount discounted from the appraised value, substantially the same as the appraised value, or greater than the appraised value.

Still another aspect of the invention includes a data storage device or other mechanism that can provide the capability to search a list of items available for sale.

Embodiments of the present invention can include a computerized system, executable software, or a data signal implementing the inventive methods of the present invention. The computer server can be accessed via a network access device, such as a computer. Similarly, the data signal can be operative with a computing device, and executable software can be embodied on a computer readable medium.

Various features and embodiments are further described in the following figures, description and claims.

DESCRIPTION OF THE DRAWINGS

FIG. 10 illustrates an exemplary data structure that can be utilized in a database implementing the present invention.

DETAILED DESCRIPTION

The present invention includes a computerized method and system for providing automated vending available to a member of the public for the sale of an item. The present invention allows for the acceptance of an item for sale into an automated vending machine with a compartment and subsequent dispensing of the item when a predetermined criteria has been fulfilled.

Figure 1:
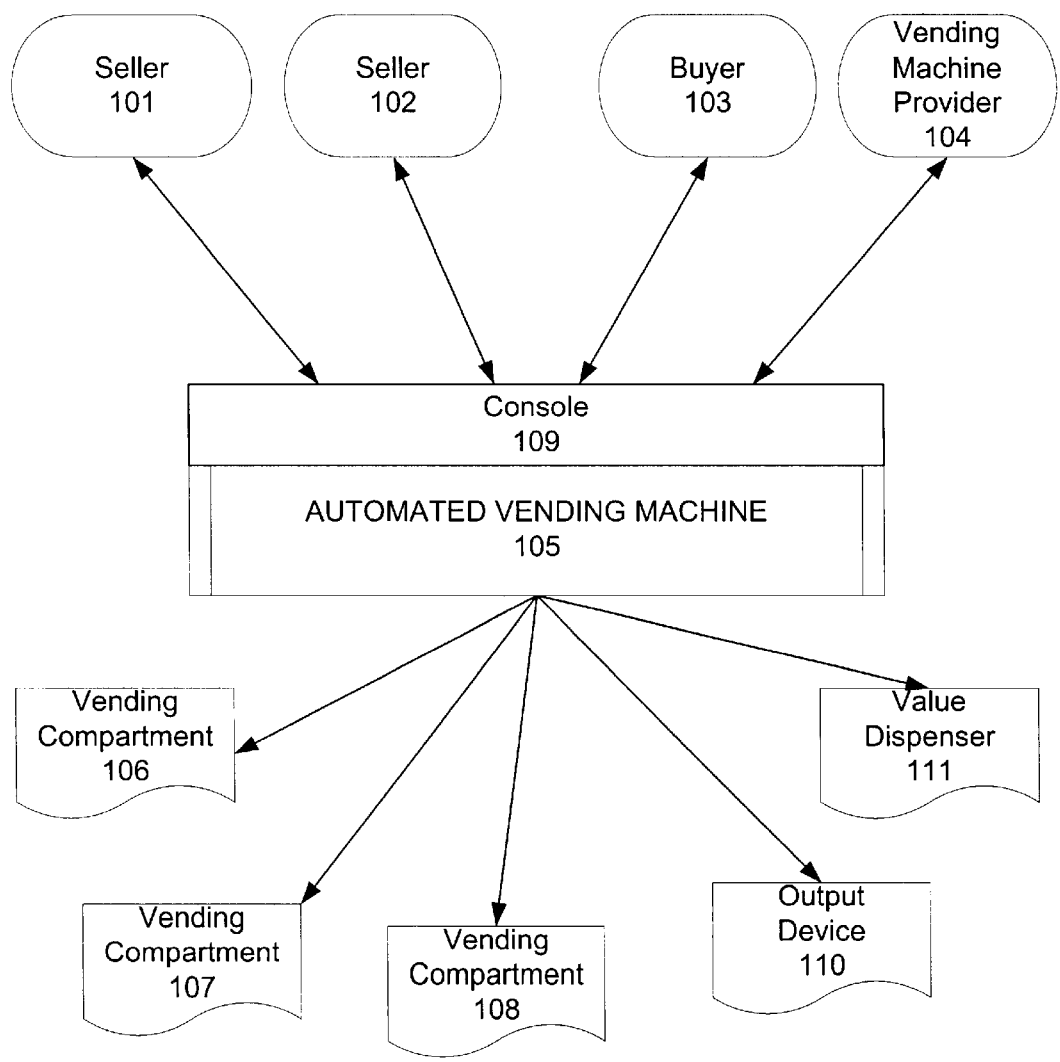
FIG. 1 illustrates a block diagram that can embody this invention.

Referring now to FIG. 1, a seller 101–102 can present an item for sale to an automated vending machine (AVM) 105 with one or more automated vending compartments 106–108. The seller 101–102 can include any member of the public such that the seller 101–102 need not maintain any type of fiduciary or commercial relationship with a provider of an AVM 104 other than to the extent such a relationship is required for a transaction at hand. Presentation of the item for sale can include a description of the item. The description can include text, audio, photo image or video image. In some embodiments, a video image can be controlled remotely to provide different angles of view of an item, such as through remote control of a tilt and zoom of a recording device. The recording device can be controlled, for example, via Internet access.

An appraised value for the item can be generated based upon the description of the item provided. In addition, a sale price at which the item will be offered for sale can be determined. In many instances, it will be advantageous to base the sale price upon the appraisal value. A buyer 103 can proffer the determined sale price of the item and have the automated vending apparatus 105 dispense the item through a corresponding vending compartment 106–108.

An item for sale can include almost any tangible item that can physically fit in an appropriate vending machine compartment or any intangible item that can be embodied in a medium for dispensing. Examples can include: memorabilia, trading cards, jewelry, sports equipment, art work, books, software, reports, kitchen utensils, tools, computer equipment, collectibles, auto parts, toys, games, camera equipment, electronic equipment, or almost any other type of item. In some embodiments, an item can be an intangible item, such as a writing or an electronic recording. A dispensing or transfer of such intangible items may involve committing the intangible item to a tangible medium, such as: a human readable hardcopy; a machine readable electronic recording; a compact disc; an optical disc storage technology such as digital video disc or digital versatile disc ("DVD") or other available medium.

A compartment can receive a tangible item by opening a physical channel to provide access to the compartment 106–108. Embodiments can include a door that opens for an individual compartment 106–108 or a bin or basket device that can receive an item. In some embodiments a common receptacle can receive an item and then sort the item into an empty compartment 106–108 according to size of the item or whether a seller 101–102 requests that the item be in a compartment 106–108 visible to the public.

Embodiments of the present invention can include placing an item in an AVM 105 and advertising the item for sale on a distributed network, such as an Internet Web site. A fair market price or other appraisal can be determined based upon a description made available to a vending machine provider 104 or an independent appraisal entity.

For example, a seller 101–102 selling an item, such as a baseball card, may deposit the baseball card into an AVM 105. For convenience and uniformity, embodiments can include an AVM 105 that can utilize envelopes, cartons, containers or the like with standard dimensions. Accordingly, the baseball card may be inserted in to an envelope or container designed to be used in the AVM 105 and provide the container to the AVM 105. The AVM would associate the container with a particular compartment 106–108.

Other embodiments include the AVM 105 purchasing the item from a seller 101–102. The AVM 015 can receive a description and make an evaluation of a price which the AVM provider 104 is willing to pay for such an item. The item can be received into the AVM 105 and value dispensed via a value dispenser 111, such as a cash dispenser, credit card credit, credit coupon, credit on a magnetic stripe card or other device.

A device capable of receiving an intangible item can include any device capable of receiving transferred data into the AVM 105. Embodiments can therefore include CD-ROM, DVD, magnetic disc drive, hardwired electronic signal, infra-red or other light sensitive data transferring device, wireless receiving device, or other available data transfer devices. Embodiments can also include a compartment 106–108 which is a data storage device, such as a disc drive, memory stick, random access memory, DVD, CDROM or other available memory storage devices.

A seller 101–102 can input information descriptive of the seller 101–102, including, for example, the name and contact information of the seller 101–102 and information relating how to charge or credit a seller' account. Embodiments can also include a seller 101–102 remaining essentially anonymous but receiving an identifier, such as an identification number which can be associated with an item received. In this manner a seller 101–102 can access the AVM 105 and be identified by the identification (ID) number, but never need to disclose their identity. For example, a seller can access the AVM 105 via an Internet website and login according to an ID number and communicate with the AVM 105 relating to an associated item. Embodiments provide for a seller, buyer or other user to access an AVM 105 via a console 109, or other input device locate in the proximity of the AVM 105 or as part of the AVM 105. The console 109 can include a keypad or other mechanism for receiving data about the seller and the item being sold. Payments can be tendered as cash, credit that can be applied to other items or other manner that can preserve the anonymity of the seller 101–102.

Data descriptive of an item, such as the baseball card, would also be input or otherwise made available to the AVM system 105. The description can likewise be made available to an entity or device capable of generating an appraisal value for the baseball card. Data can be input, for example, into a computerized device programmed to receive a description of a seller or of an item by entering the data into a graphical user interface (GUI), transmitting text, scanning images, utilizing voice to text capabilities, or other input mechanism that allows the data to be received into a computer server or other computing device capable of providing AVM functionality. Some embodiments include the data being stored in a barcode fixed to the item.

Accordingly, a seller 101–102, or other individual, can set forth the data descriptive of the seller and the item for sale and the data descriptive of the item can be received by an appraisal apparatus, which can return a market price appraisal. Information in this example might include: the player or team on the card, the year it issued, the manufacturer and the condition of the card. An automated appraisal apparatus may access a database of current market prices for an item fitting the description set forth in the input data and generate an appraisal price accordingly.

A sales price can be determined and also input into the AVM 105. Embodiments can include a sales price substantially the same as or equal to the appraisal value, a sales price discounted from the appraisal value or a sales price set at a premium above the appraisal value. Embodiments can also include making the appraisal value and the sale price available to a prospective buyer 103. A sales price can also be within a threshold range of the appraisal value, such as plus or minus 30 percent of the appraisal value. An amount "substantially the same as" can include an amount rounded to a dollar amount within a delta, such as within 10%, of the appraised value.

An identification of the item can also be ascertained and tracked by the AVM 105. Identification can be accomplished by associating the item with a particular compartment 106–108, or by affixing an identification label or tag, such as a bar code, hash, serial number or other unique identifier. Embodiments can include a seller 101–102 selecting a compartment 106–108 and associating a description and identification with the compartment 106–108.

A buyer 103 can review a description of the item, the appraised value of the item, the sale price of the item, any other data related to the item and, in some embodiments, the item itself via a visible compartment in the AVM 105. In some embodiments, a buyer 103 can cause the item to be dispensed from the automatic vending machine 105 in order to inspect the item and return the item into a receptacle on the automatic vending machine 105 if the buyer 103 decides not to retain the item.

Embodiments can include a display of the item description via a Website on the Internet or other device for causing a display screen, such as a flat panel or CRT commonly associated with a computing device 204–209, further discussed below. Embodiments can also include a display of the item description on a hard copy or screen associated with the AVM 105.

Dispensing for the purpose of inspection can be secured by receiving a payment or payment guarantee prior to the dispensement. For example, a credit card number can be received and charged for the amount of the sales price of the item prior to dispensing the item. If the item is not returned, or returned in a damage state, the credit card charge will be fully processed. If the item is returned in the equivalent condition as dispensed, the credit card can be credited. Depending upon the type of item that is dispensed, various types of technology can be utilized to ascertain that the same item is being returned. Same item identification can be accomplished, for example, utilizing: a scale to compare the weight of the item dispensed and the weight of the item returned; a bar code, hash mark, magnetic strip or other encoding device and reader to scan a code on the item; a camera associated with image recognition software; a camera for transmitting images to the seller 101–102 or an automatic vending machine provider personnel 104; or other device.

A buyer 103 can also agree to purchase an item and tender payment for the item. If the buyer 103 is viewing a description of the item online, it may be most convenient for payment to be accomplished via an electronic payment method such as a credit card, a debit card, wired money, or other online payment mechanism. Following an online payment, a buyer can be instructed on how and where to go to retrieve the item from a corresponding AVM 105.

Alternatively, a buyer can provide payment at the AVM 105. Payment at the AVM 105 may involve any workable means of transferring a currency amount including, for example: a credit or debit card reader, a cash receiving mechanism, payment to a vending machine provider 104, or other means. Some embodiments include receiving credit for an item deposited with a vending machine provider 104 or directly into an AVM 105, wherein the credit can be utilized to purchase another item from the AVM 105.

Embodiments of the invention can include a seller 101–102 receiving payment for the item in various ways which can include: electronic payment received by the seller 101–102 from the buyer 103; physical payment including cash, check, money order or other instrument, received by the seller 101–102 from the buyer 103, electronic payment to the vending machine provider 104 with subsequent payment to the seller 101–102; physical payment to the vending machine provider 104 and subsequent payment to the seller 101–102; payment into the AVM 105 with subsequent payment to the seller 101–102, or other payment arrangement.

An item can be dispensed to a buyer 103 from an AVM 105 upon fulfillment of a predetermined condition, such as the receipt of a predetermined payment amount, or upon an indication received from the seller, or on behalf of the seller. Receipt of the predetermined payment amount can be according to the methods and devices discussed above. An indication from a seller 101–102 can be received electronically, via a voice communication, via facsimile, hardcopy or other communication device. Generally, an instruction from a seller 101–102 will be received following payment from a buyer 103 to the seller 101–102; however, a seller 101–102 can issue an instruction to dispense an item for other reasons, such as retrieval of the item, conveyance of the item in a barter, a gift, or other reason. Embodiments can include an indication to dispense accompanied by an authorization device. For example an authorized indication to dispense can include an identification of an item to be dispensed and a PIN number required to authorize dispensing the item.

In some embodiments, an item can be placed into an AVM 105 for the purpose of conveying the item to another specific individual without causing a sale to be executed. For example, it may be desired to convey an item to a designated person at the convenience to the designated person. The item can be placed in the AVM 105 and the designated person can be given instructions on where the item is as well as how to access a compartment containing it. The designated person can then pick up the item or cause to have the item picked up, at their convenience.

Actual dispensing can be accomplished according to a type of item being conveyed and compartment utilized. An AVM 105 can dispense with any known means, including, for example: a helical coil turning to push an item into a area accessible to a buyer 103; a corresponding door or latch opening to allow the item to pass out of the compartment 106–108; a combination to a door or locker compartment 106–108 being conveyed to the buyer 103 wherein the combination will open a corresponding compartment 106–108; a magnetic swipe card being generated for the buyer 103, wherein the magnetic swipe card will open a corresponding compartment 106–108; a bar code printed on a paper hardcopy which can be scanned by the AVM 105 in order to open a compartment 106–108 designated by the bar code; a password or personal identification number (PIN); or other dispensing means.

Dispensing an intangible item, such as an audio recording or electronic file can be accomplished via an appropriate output device 110. For example, an audio file can be recorded into a medium, such as, a CD or DVD. A hardcopy can be dispensed via an attached printer. Files can also be dispensed according to a license to receive a number of copies. Tracking dispensement of a licensed copy can be tracked on a user retained medium, such as a bar code, magnetic stripe, or smart card, or tracked in a centralized database that can be decremented each time a buyer receives a copy of the item purchased.

A seller 101–102 can advertise, or otherwise make it known that an item is available through any known vehicle including, for example: a classified ad; online classified ad; listing in an online auction; listing the item in a vending machine 105 index of available items; or other promotional vehicle.

Similarly, a buyer 103 can notify one or more AVM providers 104 of a particular item that the buyer 103 is seeking to acquire. The buyer 103 can then be notified via e-mail, voice message, electronic instant message, facsimile or other communications vehicle of the availability of a particular item. For example, if a baseball card collector is trying to locate and purchase a baseball card of Babe Ruth in excellent condition, the baseball card collector can notify various vending machine providers 104 accordingly. If a vending machine provider 104 becomes aware of the availability of such a Babe Ruth baseball card the vending machine providers 104 can notify the potential buyer 103, the baseball card collector.

If desired, a vending machine provider 104 can offer packing and shipping services to facilitate sales to a buyer 103 that is not local to the automatic vending machine 105.

In some embodiments, requests for specific items can be maintained in a database. A database of items received into an AVM 105 can also be maintained and periodically or continuously searched for any items included in the database of requested items. If a match occurs, a requestor can be notified of the availability of the requested item. A database can also include data relating to buyers 103 and sellers 101–102, such as name, address, payment data, as well as items purchased or sold and a frequency of transactions. Embodiments can provide for information to be stored locally to the AVM 105 and at a centralized database.

Searching can be facilitated by utilizing any known data manipulation processes, such as a scrubbing routine to correlate various different spellings of one name or term. In addition, data mining or other data analysis techniques can be utilized to analyze markets for various types of items. Analysis can include, for example: what types of items are received into one or more AVMs 105 in particular locations, what types of items sell at particular locations; average, median, high or low price of sold items by location, item type, time of year, or other criteria; time to sell various items at various locations, or any other analysis that may prove useful to a purpose.

Analysis of data quantifying marketing through an AVM 105 can be utilized for purposes useful to a seller 101–102, buyer 103, vending machine provider 104 or other interested entity. Analysis purposes can include, for example: helping a seller 101–102 determine a particular location for selling a particular item; helping a buyer 103 locate or peruse a particular type of item; helping a vending machine provider 104 determine a price for use of a particular machine; facilitate determining a best time of year to sell an item; aid in determining a fair market value for similar items; or other purpose.

Analysis techniques and search retrieval can utilize any methods known in the industry, including, for example indexing, Boolean retrieval, relevance ranking, key word matching, full text search or other techniques.

Embodiments can include an automated vending compartment that is allocated to a seller 101–102 according to different needs. For example, a compartment 106–108 can be allocated for a one time sale, wherein a seller 101–102 places an item for sale in a compartment 106–108 and the item remains in the compartment 106–108 until the seller 101–102 sells the item or retrieves the item An arrangement for a one time sale may have a maximum period of time that the compartment 106–108 can be utilized by the seller 101–102 for the sale of an item. If the maximum period of time elapses and an occupied compartment has not been vacated commensurate with the sale of the item, then the seller 101–102 can be charged an additional fee for continued use of the compartment 106–108. Other embodiments can address a situation where a buyer 103 purchases and pays for an item but does not retrieve the item from its compartment 106–108. In this scenario, a buyer can be responsible for an additional charge for continued occupation of the compartment 106–108.

Additional embodiments can include a seller 101–102 arranging to utilize a compartment for a predetermined period of time. The seller 101–102 can market and sell as many items as the seller 101–102 can arrange to sell during the period of time. Such embodiments can include a scenario where a seller 101–102 markets and sells an item via a known forum, such as an online auction or a classified ad and uses the AVM 105 as a delivery mechanism for delivering a sold item. According to these embodiments, it may not be as important for a Seller 101–102 to ascertain beforehand which item will sell or when. The seller 101–102 can market one or multiple items and bargain with a buyer 103 until a deal is reached on a specific item. The seller 101–102 can then place the specific item sold to a particular seller 101–102 in a compartment 106–108 such that the buyer 103 can retrieve the item with out having to arrange a meeting with the seller 101–102.

If desired, an AVM 105 can include a mechanism for automatically replenishing an empty compartment. For example, an AVM 105 may include a slot or chute capable of holding multiple items and a dispensing mechanism which will dispense one item at a time. A next item to be dispensed can be displayed via an image made available to the network, physical display, a written description or other mechanism. Embodiments can include an item being displayed and sold which is identified by a hash mark, bar code, magnetic strip, smart card chip or other identifier.

Still other embodiments can include a digital camera, or other imaging device, such as a web cam, which can take a picture of an item in a compartment and transmit an image of the item via the Internet to an interested party. Images can be repeatedly taken at different points in time, or taken just prior to placing an item in the compartment 106–108. As discussed above, in some embodiments, an image from a digital camera can be utilized to confirm that an item has been returned after an inspection.

If desired, or as required by prevailing law, an AVM provider 104 can limit the contents that a seller 101–102 or other party can place in a compartment. For example, it may be prohibited to sell food stuff, hazardous materials or other inappropriate items via an AVM 105. Other embodiments can include an AVM 105 providing for special needs of items such as refrigeration.

Figure 2:
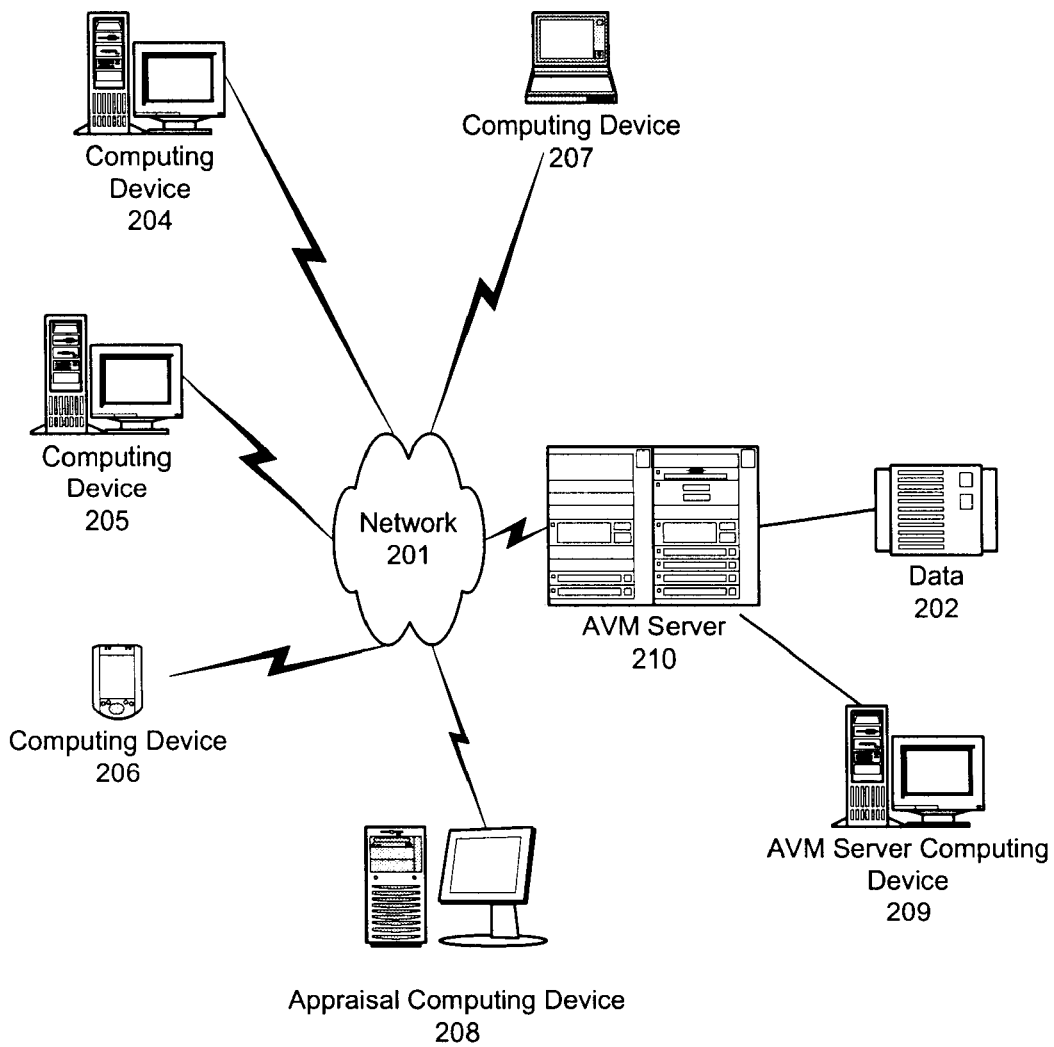
FIG. 2 illustrates a network of computer systems that can embody an automated vending system.

Referring now to FIG. 2, a network diagram illustrating one embodiment of the present invention is shown 200. An AVM 105 can include a computerized AVM server 210 accessible via a distributed network 201, such as the Internet, a private network, a local area network (LAN) or direct link. A member of the public, such as a buyer 103, seller 101–102, AVM provider 104 or other party interested in automated vending can use a computerized device 204–207 to receive, input, transmit or view information processed in the AVM server 210. An appraisal computing device 208 and an AVM Server computing device 209 can also be utilized to interact with and receive, input, transmit or view information processed in the AVM server 210. A protocol, such as the transmission control protocol Internet protocol (TCP/IP) can be utilized to provide consistency and reliability.

A computing access device 204–209 can be utilized to access the AVM server 210. The computing device 204–209 can include a processor, memory, a user input device, such as a keyboard and/or mouse, and a user output device, such as a display screen and/or printer. The computing devices 204–209 can communicate with the AVM server 210 to access data and programs stored on the AVM server 210, or to run applications hosted on the AVM server 210. The computing device 204–209 may interact with the AVM server 210 as if the AVM server 210 were a single entity in the network 201. However, the AVM server 210 may include multiple processing and database sub-systems, such as cooperative or redundant processing and/or database servers that can be geographically dispersed throughout the network 201. Similarly, an automated vending related server 210 can include a single entity in the network 201 or multiple processing and database sub-systems, such as cooperative or redundant processing and/or database servers that can be geographically dispersed throughout the network 201.

The AVM server 210 includes one or more databases 202 storing data relating to automated vending, such as a listing of items for sale, a sale price for each item, a seller 101–102 associated with each item, a compartment location for each item and ay other related data. The AVM server 210 may interact with and receive data from and transmit data to various computing devices 204–209. Gathered data can be received via electronic input and structured according to items offered for sale. It can also be utilized to conduct sales or marketing analysis.

In some embodiments, an appraisal computing device 208 can be utilized to provide an appraisal function into the AVM server 210. Other embodiments can include an appraisal function built into the AVM server 210. Similarly an AVM server access device 209 can be utilized to perform administrative or other functions on the AVM server 210.

Typically a client, such as a seller 101–102, buyer 103, AVM provider 104 or other party, will access the AVM server 210 using client software executed at a computing device 204–209. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from a server 210 to a computing device 204–209 and executed at the computing device 204–209. Other implementations include proprietary software installed from a computer readable medium, such as a CD ROM. The invention may therefore be implemented in digital electronic circuitry, computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 3:
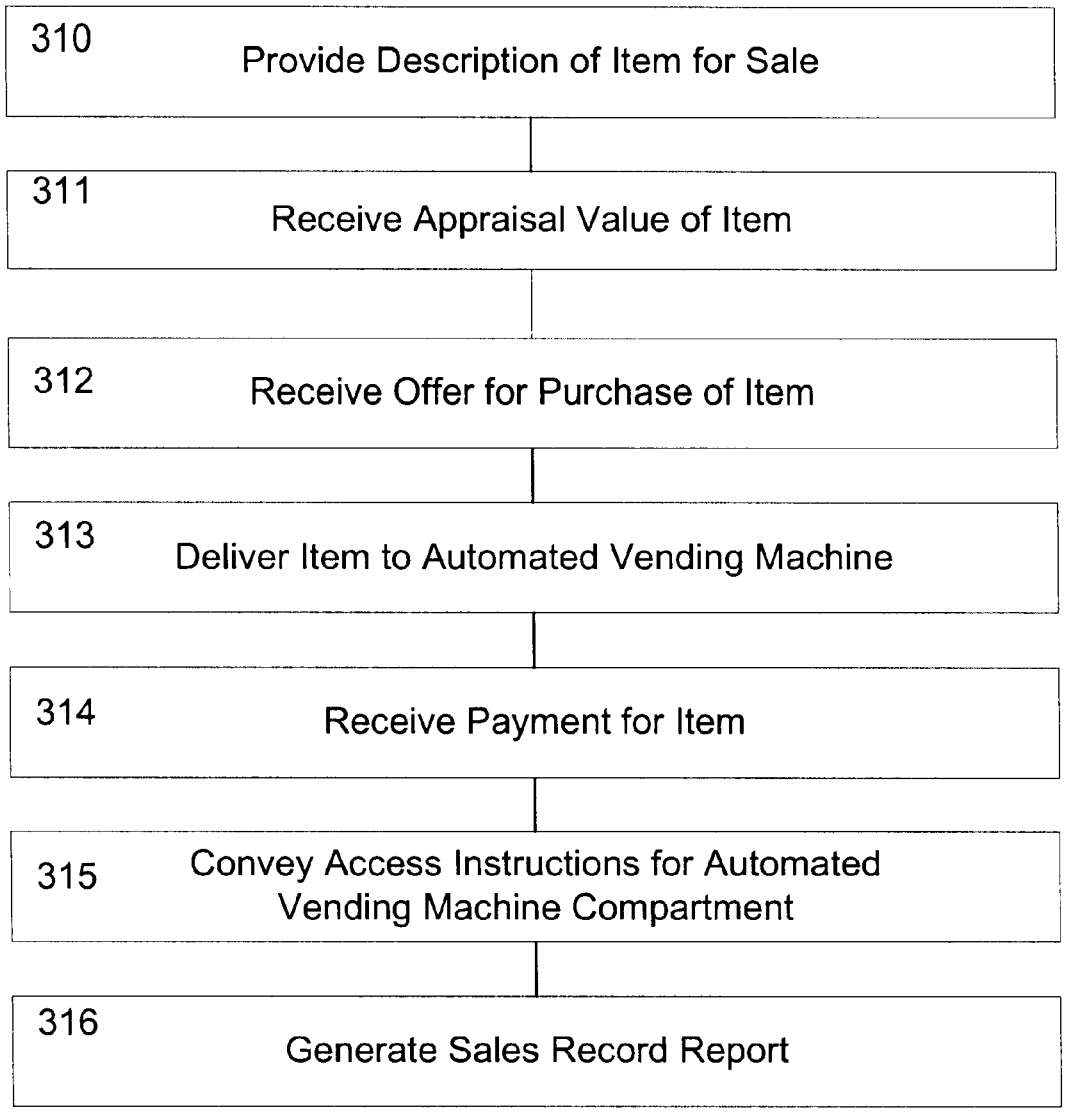
FIG. 3 illustrates a flow of exemplary steps that can be executed while implementing the present invention.

Referring now to FIG. 3, exemplary steps that can be taken by a seller 101–102 or other entity to implement a use of the AVM system 105 can include providing a description of an item for sale 310 to an AVM server 210, provider 104 or other appropriate entity. The seller 101–102 can receive an appraisal according to the description 311.

A buyer 101–102 or seller 103 can also request an identification of an appraisal source. The appraisal source can be useful to ascertain how credible a particular valuation may be, or be utilized to contact an appraisal source to obtain additional information. For example, an appraisal source may be a licensed appraiser who may have very credible information or simple listing book type value.

Receipt of the identification of an appraisal source can be accomplished via an electronic message, an entry in an electronic report, facsimile, voice message or any other available method of communication.

A seller 101–102 can receive an offer for purchase of the item for sale 312. If desired, an AVM system 105 can require that an offer meet a minimum threshold before it is received by the seller 101–102.

An item can be delivered to an AVM 105 either before or after the sale of the item. An item that is delivered prior to the sale of the item can be displayed at the AVM 105 or listed in an index of items available via the AVM 105. However, delivery of the time prior to the sale of the item may cause inconvenience if the item is not sold. Delivery after a price has been negotiated and agreed to by any necessary parties involved can make more efficient use of the AVM compartment 106–108.

Similarly, payment can be received for the item 104 at the time of delivery, or prior to disclosure of what compartment the item will be located in. Sales resulting from perusal of AVM compartments 106–108 will naturally result in payment commensurate with delivery of the item. Sales resulting from an online sales mechanism may be negotiated and payment received prior to disclosing where the item is located. Obviously, a sale originating on the Internet can also result in a buyer being informed of the location of the item so that the buyer can pick up the item from the AVM 105 and make payment at the time of the pick up.

Instructions on how to access a corresponding AVM compartment can be conveyed to the buyer or other designated entity 315. Access to the compartment can include any known technology for causing a machine to dispense an item or grant access to a compartment. For example, dispensing can occur as a result of: a combination of alphanumeric or other uniquely identified keys being activated; scan of a bar code; resultant to a magnetic swipe, such as swiping a credit card utilized to purchase the item or a disposable magnetic swipe printed by the AVM 105 at time of purchase; entering a PIN number; or other method for activating a specific compartment.

A user can also cause an archive to be created relating to an AVM 105 transaction. An archive may include, for example, information received relating to an appraisal value, offers made for an item, consummated sales, geographic areas of sales, demographic information relating to sales, results relating to a particular marketing effort or other information. In addition, the user can cause an AVM server 210 or to generate reports to quantify the archived information and otherwise actions taken relating to automated vending 316.

Figure 4:
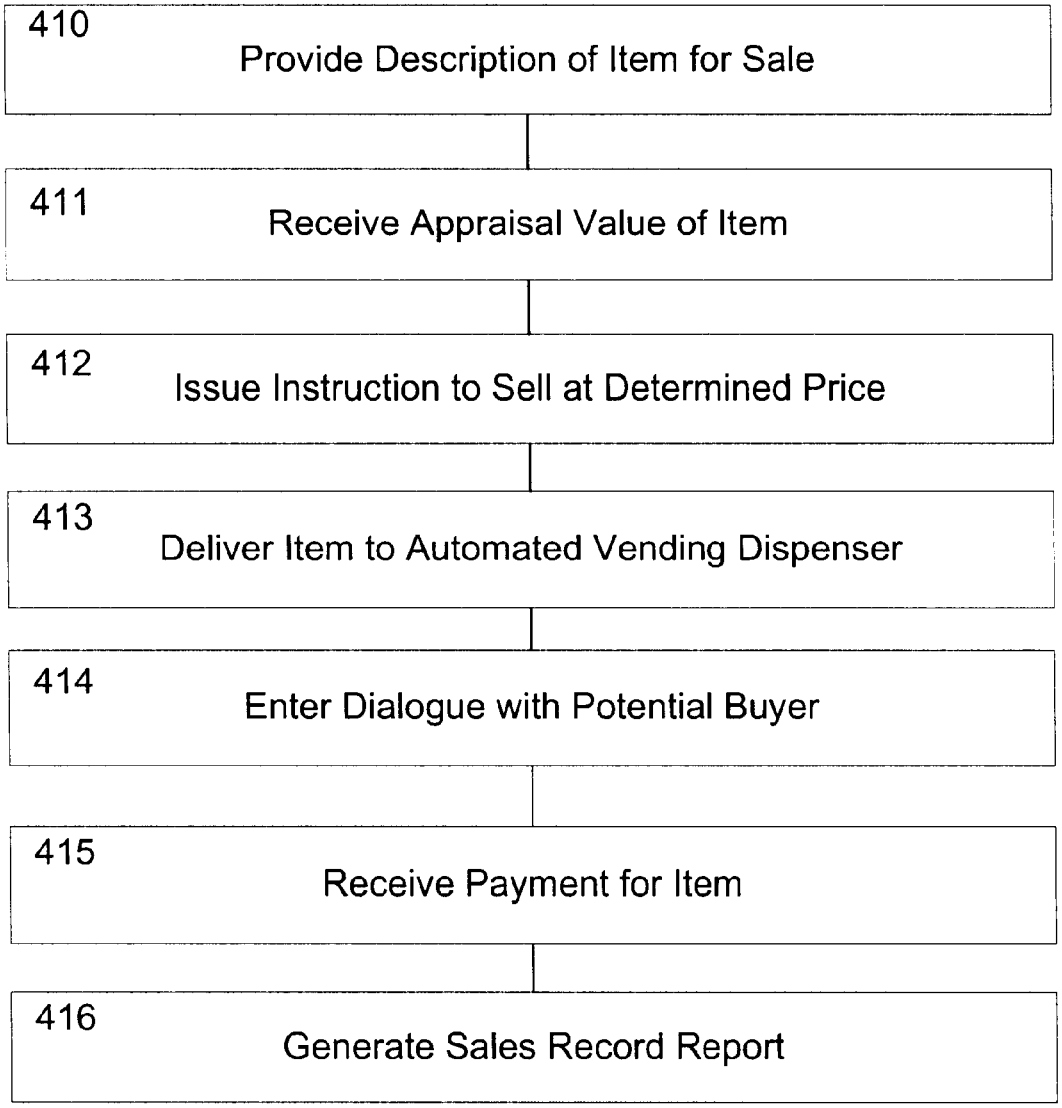
FIG. 4 illustrates a flow of additional exemplary steps that can be executed by a seller while implementing the present invention.

Referring now to FIG. 4, another variation of steps that can be completed by a seller 101–102 is illustrated. A seller 101–102 can provide the description of the item to be sold 410 and receive the appraisal value for the item 411. The seller can deliver the item 413 to the AVM 105 or the provider 104 and issue an instruction to sell the item at a determined price 412, wherein the determined price can be based upon the appraisal value or other criteria.

Some embodiments can allow a seller 101–102 and a potential buyer 103 to enter into a dialogue relating to the item for sale. The dialogue can be accomplished via an electronic mechanism such as, for example, e-mail, instant messaging, chat room or other communications, or via voice or facsimile communication.

The seller can also receive payment for the item 415. In some embodiments, a seller can receive full or partial payment for the item upon delivery of the item to the AVM 105. According to a particular deal entered into, a seller 101–102 may or may not retain a right to redeem the item for a predetermined amount of time. The AVM provider or other party can take responsibility for selling the item or retaining ownership if the item does not sell and the seller 101–102 does not redeem. Embodiments can also include a third party providing the upfront payment and entering into a deal to market or retain ownership of the item, in these embodiments, the AVM provider 104 can act as a medium for receipt of the item and placement of the item into a compartment 106–108. The third party can supply full or partial payment to the seller and gain the right to market the item or retain ownership. Interactions and/or negotiations for any of above scenarios can be accomplished via online communications or in person at a location hosting an AVM 105.

A report relating to any sale, negotiation, transaction or selling arrangement can be generated and archived or output 416.

Figure 5:
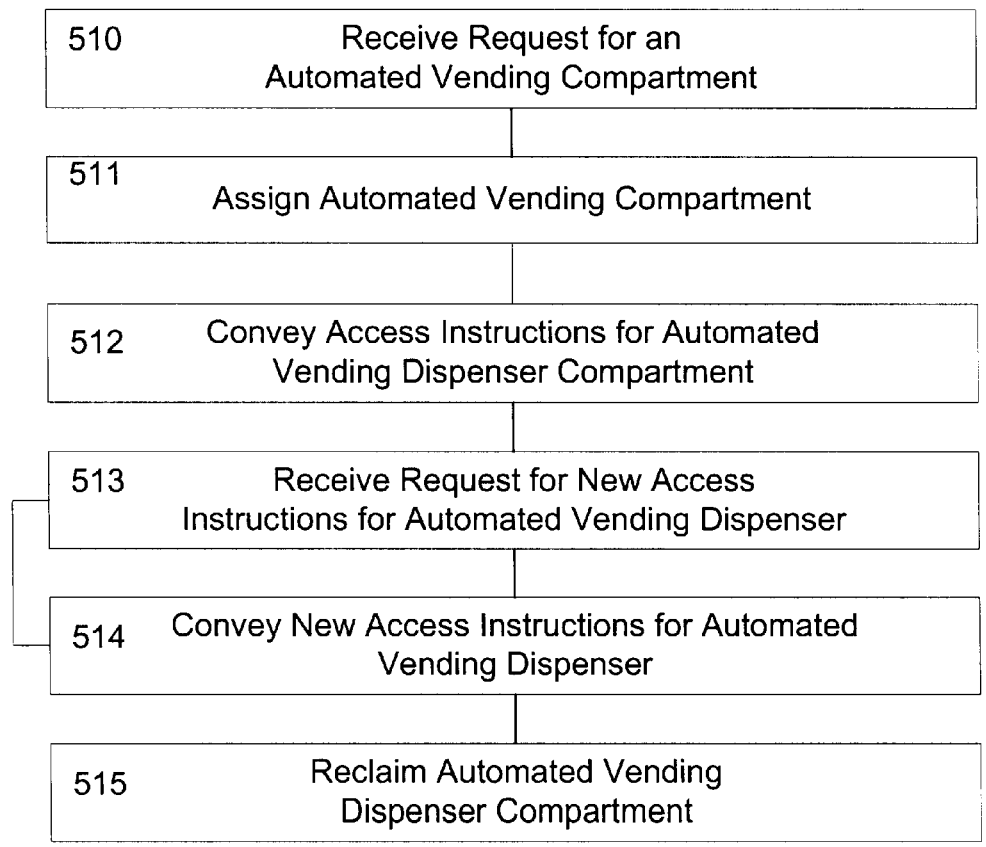
FIG. 5 illustrates a flow of exemplary steps that can be performed by an AVM provider while implementing the present invention.

Referring now to FIG. 5, a series of exemplary steps that can be performed by an AVM provider 104 according to the present invention are illustrated. Since certain aspects of a process relating to an AVM may be automated, steps described herein may be adapted to be performed by the AVM 105 or the AVM provider 104. In the discussion of these steps, it will be understood that each step performed by the AVM 105 can also be performed by the AVM provider 104. A request for an AVM compartment 106–108 can be received 510 and a compartment 106–108 can be assigned according to the request 511. In addition, instructions relating to how to access the AVM compartment 106–108 can be provided 512. Instructions on access can include, for example, a combination or PIN number utilized to gain access to a compartment 106–108.

In some embodiments, a request for new access instructions can be received 513. New access instructions can be conveyed accordingly 514 and may include for example, issuance of a new combination or a new PIN that can be utilized to gain access to a compartment. New access instructions may be appropriate, for example, in the situation where a compartment is made available for a set period of time and a seller 101–102 can complete multiple transactions during that period.

The AVM compartment 106–108 can be reclaimed when an agreed upon period of use is completed 515 or if any provisions pertaining to an agreement regarding use of the compartment 106–108 are violated, such as, for example, lack of payment or an un-permitted use.

Figure 6:
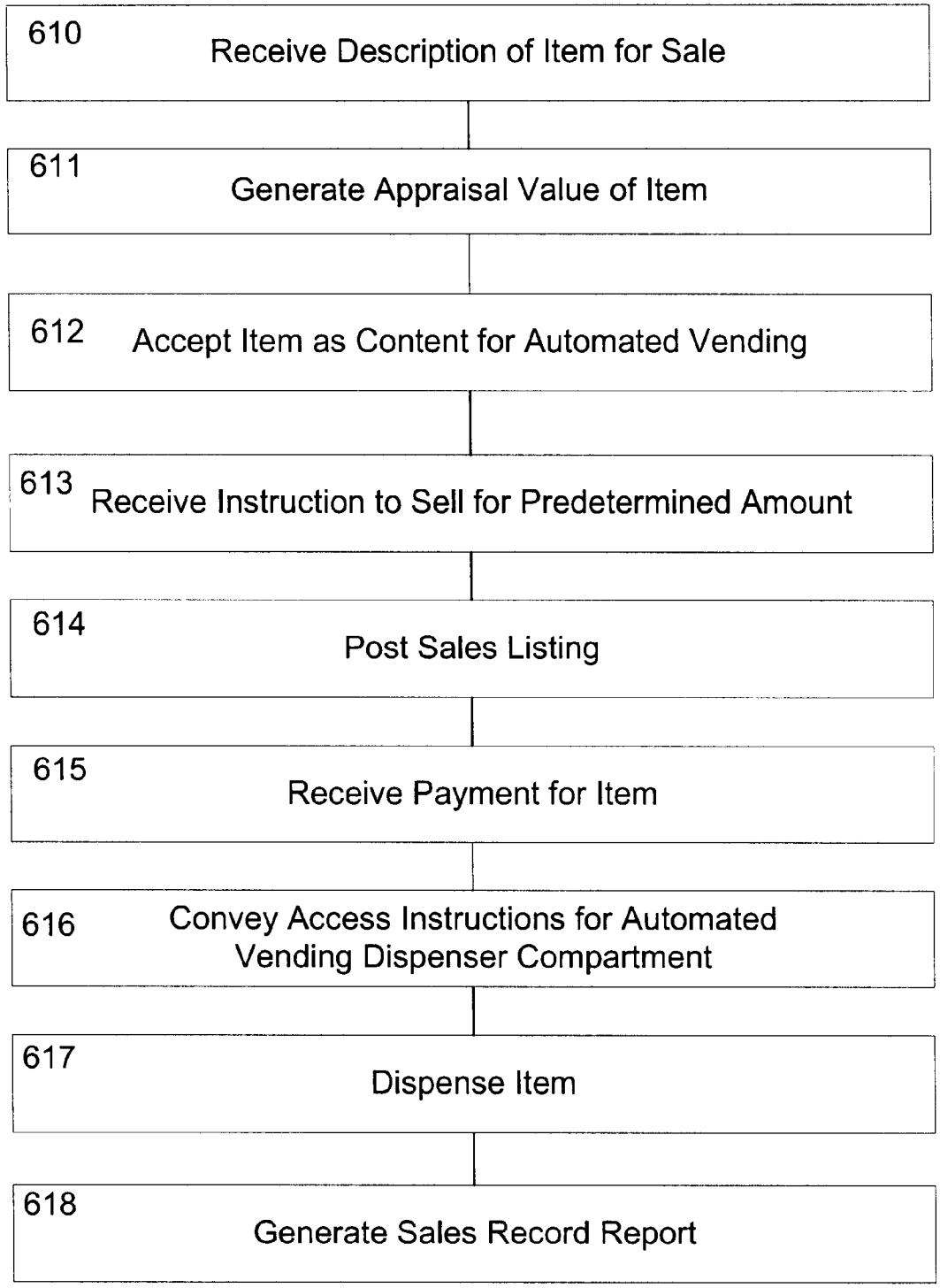
FIG. 6 illustrates another flow of exemplary steps that can be performed by an AVM provider while implementing the present invention.

Referring now to FIG. 6, another series of exemplary steps that can be performed by an AVM provider 104 according to the present invention are illustrated, wherein the steps in FIG. 6 allow for an AVM provider or third party to facilitate the marketing of an item. A description of the item can be received 610 and an appraisal can be generated 611 so that the item can be accepted as content 612 for an AVM 105. Acceptance of the item 612 can be accompanied with receipt of an instruction to sell the item for a predetermined amount 613, which can include any amount meeting or exceeding a minimum threshold amount.

In some embodiments acceptance of an item to be sold 612 will include receipt of an electronic file. The item to be sold can be a copy of the contents of the file, for example a hardcopy or an electronic copy on a medium readable by a computer or other electronic or automated apparatus.

A sales listing can be posted 614 or other marketing instrument implemented to facilitate the sale of the item.

Receipt of payment for the item can be received 615 upon which access instructions to the AVM compartment 106–108 can be conveyed 616 and the item dispensed to the buyer 103 or other designated entity 617. A sales record report can be generated 618.

Figure 7:
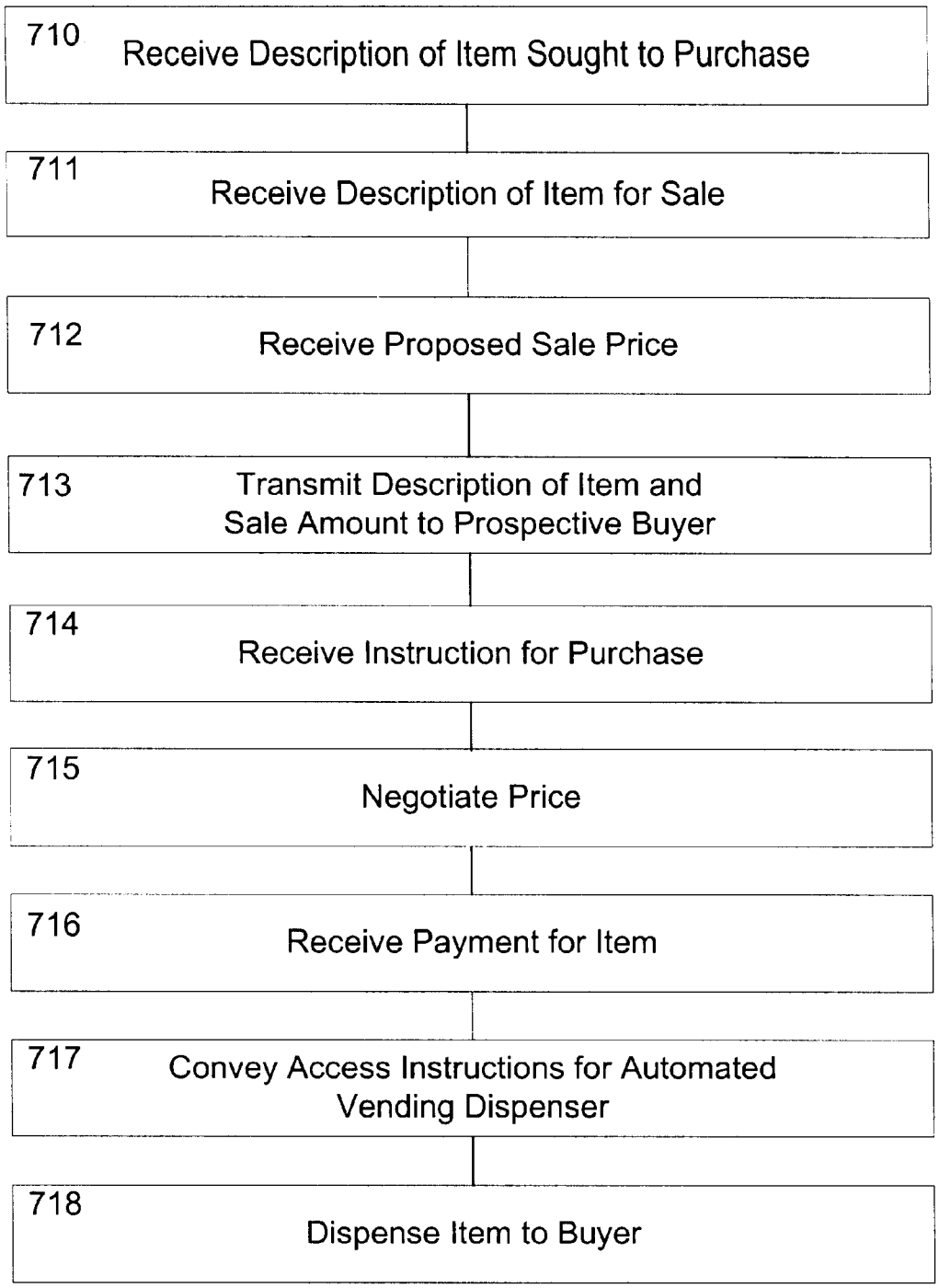
FIG. 7 illustrates flow of steps related to a purchase of an item sought in relation to the present invention.

Referring now to FIG. 7, exemplary steps are illustrated that include additional embodiments of the present invention wherein an AVM provider 104 or other party receives a request to purchase a particular item. A description of the item that a potential buyer 104 wishes to purchase can be received 710. In addition, a description of an item that is for sale can also be received 711. A sale price for the item for can also be received 712 such that the description of the item and the price can be transmitted 713 to the prospective buyer 104. A price can also be negotiated 714 if desired until an instruction is received to purchase the item 715. Payment can then be received 816 and access instructions to an associated AVM compartment 106–108 can be conveyed 817 such that the item can be dispensed to the Buyer 103 or other designated entity 718.

It should be noted that any of the steps described can be utilized in any sequence that is appropriate to a given circumstance and that steps described in conjunction with each illustration are not limited to being practiced with other steps discussed in relation with that illustration. All steps are exemplary and can be intermixed with other steps from the various illustrations as appropriate.

Figure 8:
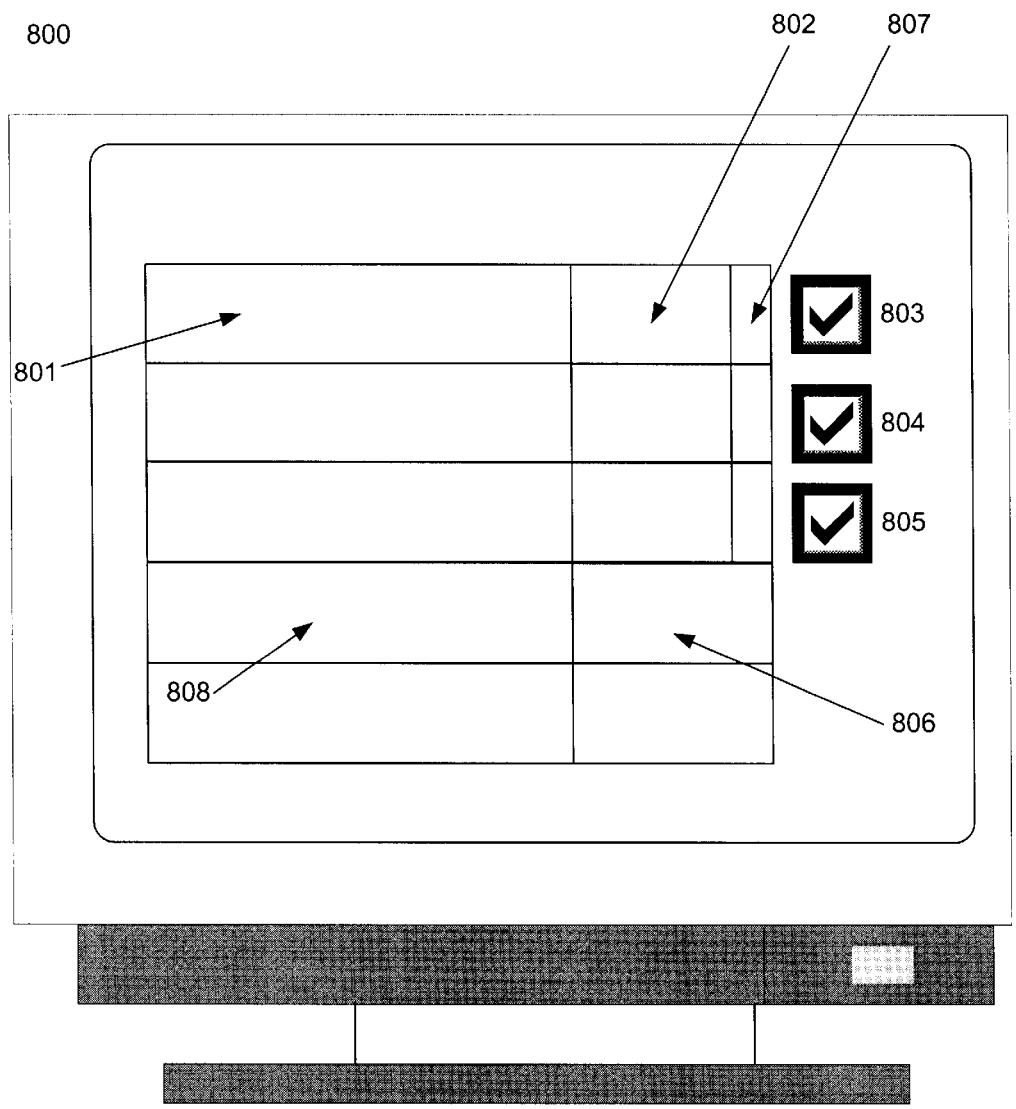
FIG. 8 illustrates an exemplary graphical user interface that can be utilized in conjunction with the present invention.

Referring now to FIG. 8, an exemplary GUI for presenting various aspects of the present invention on a computing device is displayed. A GUI 800 can be made available via a website accessible on the network 201. The GUI 800 can include geographic areas of a user interface containing AVM procedures 801, including those procedures specifically followed in relation to a sale of an item, purchase of an item, search for an item, or other responsive action 114. Additional areas can include a list of items for sale or items wanted 802, a description of electronic or hardcopy reports available 808, a quantity of items 807 if appropriate, an interactive area to generate a report 806 of other function related to an AVM 105. A GUI useful in relation to the present invention can also include programmable interactive user devices, such as a check box or button 803–805 to indicate an instruction to buy or sell an item as appropriate, to indicate an instruction to dispense an item.

Figure 9:
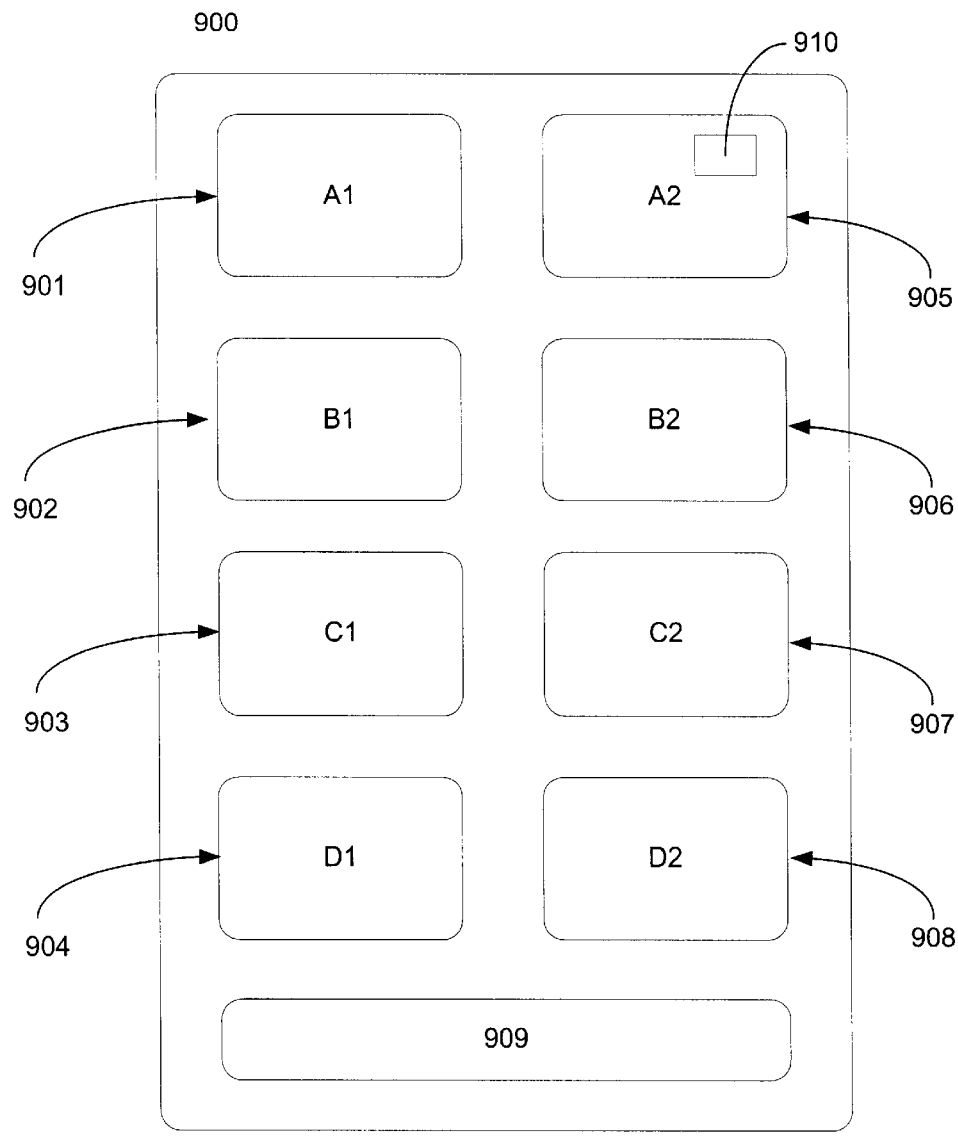
FIG. 9 illustrates an exemplary block representation of a portion of an AVM.

Referring now to FIG. 9 an example of portion of an automated vending machine is illustrated 900. The portion of the automated vending machine can include multiple compartments 901–908. In some embodiments a front to a compartment 901–908 can allow a person to see inside to view an item for sale. Other embodiments can include a solid front to the compartments 901–908. Embodiments can also include compartments 901–908 with individual access, such as though a door that can open to allow access to the individual compartment 901–908 or the portion of an automated vending machine 900 can include a common dispensing area 909. An item being sold can be transferred from an individual compartment 901–908 to the common dispensing area such that it can be retrieved from the common dispensing area 909. A compartment 901–908 can also include an access portion 910. The access portion can include a mechanism such as a keypad, card swipe, bar code scanner, or other device utilized for granting access to the compartment 901–908.

Referring now to FIG. 10, an exemplary data structure that can be utilized in a database implementing the present invention is illustrated. The database can include an item ID number, wherein the item ID number can be associated with an item for sale or an item wanted. The database 1000 can also include a description of an item 1002 and a price for an item 1003 as well as any other pertinent data in an appropriate data field.

A number of embodiments of the present invention have been described. Nevertheless, it will be understood that various modifications may be made without departing from the spirit and scope of the invention. For example, a computing device 204-9 can include a personal computer executing an operating system such as Microsoft Windows™, Unix™, or Apple Mac OS™, as well as software applications, such as a JAVA program or a web browser. Computing devices 204–209 can also be a terminal device, a palm-type computer, mobile WEB access device, a TV WEB browser or other device that can adhere to a point-to-point or network communication protocol such as the Internet protocol. Computers and network access devices can include a processor, RAM and/or ROM memory, a display capability, an input device and hard disk or other relatively permanent storage. An AVM 105 can be controlled via a wired or wireless network connection and items permitted to be placed in an AVM can be specified according to particular attributes of the AVM 105, such as refrigerated compartments or non-impact dispensing of an item. Accordingly, other embodiments are within the scope of the following claims.

A number of embodiments of the present invention have been described. Nevertheless, it will be understood that various modifications may be made without departing from the spirit and scope of the invention. Accordingly, other embodiments are within the scope of the following claims.

What is claimed is:

1. An apparatus having one or more compartments with a means for dispensing a content of a compartment upon receipt of a payment, comprising:

means for communicatively connecting the apparatus over a network to a network of computing devices;

means for accepting an item, from a member of the public, as content into an empty compartment;

means for identifying the item accepted;

means for receiving, over the communication connection, an appraised value of the identified item;

means for displaying the appraised value in association with the compartment containing the item; and means for dispensing the item in response to receiving predetermined sales amount.

2. The apparatus of claim 1 wherein the means for accepting an item is capable of receiving a tangible item.

3. The apparatus of claim 1 wherein the means for accepting an item is capable of receiving an intangible item.

4. The apparatus of claim 1 wherein the network of computing devices comprises the Internet.

5. The apparatus of claim 1 wherein the means for identifying the item accepted comprises a barcode label.

6. The apparatus of claim 1 wherein the means for displaying the appraised value in association with the compartment containing the item comprises an Internet website.

7. The apparatus of claim 1 wherein the means for displaying the appraised value in association with the compartment containing the item comprises a printed hardcopy.

8. The apparatus of claim 1 wherein the predetermined sales amount is within a threshold range of the appraised value amount for the item.

9. The apparatus of claim 1 wherein the means for dispensing the item comprises a barcode scanner.

10. The apparatus of claim 1 additionally comprising a means for receiving identification information and contact information of the member of the public.

11. The apparatus of claim 1 additionally comprising a means for receiving data descriptive of the item.

12. The apparatus of claim 1 additionally comprising a means for transmitting an image of the item to the computing devices.

13. The apparatus of claim 1 additionally comprising a means for the member of the public to modify the sales amount.

14. The apparatus of claim 1 additionally comprising a means for dispensing value for an item received.

15. An automated vending machine comprising a plurality of compartments having a means for dispensing a content of one of the compartments, the apparatus comprising:

means for communicatively connecting the apparatus over a network to a network of computing devices;

means for accepting an item as content in an empty one of the compartments from a first member of the public;

means for receiving identification information and contact information of the first member of the public;

means for enabling a second member of the public to contact, over the network, the first member of the public concerning the item;

means for dispensing the item in response to at least one of a) receiving an indication to dispense over the network from the first member of the public, and b) receiving a predetermined payment amount for the item.

16. The vending machine of claim 15 additionally comprising a means for receiving identification information and contact information descriptive of the first member of the public.

17. The vending machine of claim 15 additionally comprising:
   a means for receiving an appraised value of the identified item; and
   a means for displaying the appraised value in association with the compartment containing the item.

18. The vending machine of claim 15 additionally comprising a means for searching a list of items available for sale.

19. The method of claim 15 wherein the indication to dispense is remotely activated over the network.

20. A method for conveying an item via at least one automated vending machine accessible via a communications network, the method comprising:
   registering receipt of an item from a member of the public into the automated vending machine;
   receiving an appraisal for the item;
   indicating a sale price for the item; and
   dispensing the item in response to at least one of a) receiving an authorized indication over the network to dispense, and b) receiving payment in the amount of the sale price.

21. The method of claim 20 wherein dispensing the item comprises conveying access instructions for an automated vending machine compartment.

22. The method of claim 20 additionally comprising the steps of:
   receiving a description of an item sought by a potential buyer;
   identifying an item in an automated vending machine compartment matching the description of the item sought; and
   transmitting information relating to the item, the information comprising at least one of a) a location of the item and b) an option for delivery of the item.

23. A method for conveying an item via an automated vending machine accessible via a communications network, the method comprising:
   receiving a request from a member of the public for use of an automated vending machine compartment;
   assigning an automated vending machine compartment and a period of time the member of the public may utilize the automated vending machine compartment;
   conveying a first set of instructions for accessing the automated vending machine compartment;
   receiving a request for new access instructions for the automated vending machine compartment subsequent to an access utilizing the first set of instructions for accessing the automated vending machine compartment;
   conveying a new set of access instructions to the automated vending machine compartment; and
   reclaiming the automated vending machine compartment upon the expiration of the period of time.

24. Computer executable program code residing on a computer-readable medium, the program code comprising instructions for causing the computer to:
   receive an item from a member of the public into an automated vending machine;
   receive an appraisal for the item;
   indicate a sale price for the item; and
   dispense the item in response to at least one of a) receiving an authorized indication over a network to dispense, and b) receiving payment in the amount of the sale price.

25. A computer data signal embodied in a digital data stream comprising data relating to automated vending, wherein the computer data signal is generated by a method comprising the steps of:
   receiving an item from a member of the public into an automated vending machine;
   receiving an appraisal for the item;
   receiving a sale price for the item; and
   dispensing the item in response to at least one of a) receiving an authorized indication to dispense over the network, and b) receiving payment in the amount of the sale price.

26. A method of interacting with a network access device so as to purchase an item from an automated vending machine, the method comprising the steps of:
   initiating interaction with an automated vending machine server via a communications network;
   sending information descriptive of the item sought to the automated vending machine server;
   receiving data descriptive of an item for sale comprising at least one of a) a sale price for the item, b) a location of the item and c) contact information for a seller of the item;
   implementing a payment for the item; and
   receiving at least one of a) instructions on accessing an automated vending machine compartment containing the item sought or b) an option for delivery of the item.

* * * * *